(12) United States Patent
Zhou et al.

(10) Patent No.: US 9,384,015 B2
(45) Date of Patent: Jul. 5, 2016

(54) TECHNIQUES FOR DYNAMICALLY REDIRECTING DEVICE DRIVER OPERATIONS TO USER SPACE

(71) Applicants: Xiaocheng Zhou, Beijing (CN); Hu Chen, Beijing (CN); Shoumeng Yan, Beijing (CN); Ying Gao, Beijing (CN)

(72) Inventors: Xiaocheng Zhou, Beijing (CN); Hu Chen, Beijing (CN); Shoumeng Yan, Beijing (CN); Ying Gao, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 83 days.

(21) Appl. No.: 14/129,934

(22) PCT Filed: Jul. 16, 2013

(86) PCT No.: PCT/CN2013/079471
§ 371 (c)(1),
(2) Date: Dec. 28, 2013

(87) PCT Pub. No.: WO2015/006923
PCT Pub. Date: Jan. 22, 2015

(65) Prior Publication Data
US 2015/0212832 A1   Jul. 30, 2015

(51) Int. Cl.
*G06F 9/445* (2006.01)
*G06F 9/44* (2006.01)
*G06F 12/02* (2006.01)

(52) U.S. Cl.
CPC .......... *G06F 9/44505* (2013.01); *G06F 9/4411* (2013.01); *G06F 12/023* (2013.01); *G06F 2212/251* (2013.01)

(58) Field of Classification Search
CPC . G06F 9/44505; G06F 9/4411; G06F 12/023; G06F 2212/251
See application file for complete search history.

(56) References Cited

U.S. PATENT DOCUMENTS

| 7,099,866 B1 * | 8/2006 | Crosbie ................. G06F 21/552 |
| 7,392,527 B2 | 6/2008 | Callender |
| 7,941,813 B1 | 5/2011 | Protassov et al. |
| 2003/0014521 A1 * | 1/2003 | Elson et al. .................... 709/225 |
| 2006/0253859 A1 | 11/2006 | Dai et al. |
| 2009/0296685 A1 * | 12/2009 | O'Shea et al. ................ 370/351 |
| 2012/0131375 A1 * | 5/2012 | Adda et al. ........................ 714/2 |

FOREIGN PATENT DOCUMENTS

| CN | 101236499 | 8/2008 |
| CN | 103051716 | 4/2013 |

OTHER PUBLICATIONS

International Search Report and Written Opinion received for PCT Patent Application No. PCT/CN2013/079471, mailed Apr. 23, 2014, 13 pages.

* cited by examiner

*Primary Examiner* — Charles E Anya

(57) ABSTRACT

Various embodiments are generally directed an apparatus and method for configuring an execution environment in a user space for device driver operations and redirecting a device driver operation for execution in the execution environment in the user space including copying instructions of the device driver operation from the kernel space to a user process in the user space. In addition, the redirected device driver operation may be executed in the execution environment in the user space.

25 Claims, 12 Drawing Sheets

300

*Determine the start address and the length of the device driver operation to be redirected and copy the binary files of the device driver operation to a user process in user space*
*305*

*Generate a operation to call a control operation with the process identification (ID) of the user process and the redirected device driver operation user space address as parameters*
*310*

*Store the beginning instructions of the original binary file in the kernel space of the device driver operation in memory and change the instructions to a jump instruction*
*315*

*Determine if the any of the copied instructions of the binary file requires an interrupt, store the instruction in memory, and change a first byte to an interrupt command*
*320*

*Recover the stored instructions from memory for the binary file in the kernel space*
*325*

- CONFIGURE AN EXECUTION ENVIRONMENT IN A USER SPACE FOR DEVICE DRIVER OPERATIONS
  705

- REDIRECT A DEVICE DRIVER OPERATION TO THE EXECUTION ENVIRONMENT IN THE USER SPACE FOR EXECUTION INCLUDING COPYING INSTRUCTIONS OF THE DEVICE DRIVER OPERATION FROM THE KERNEL SPACE TO A USER PROCESS IN THE USER SPACE
  710

- EXECUTE THE REDIRECTED DEVICE DRIVER OPERATION IN THE EXECUTION ENVIRONMENT IN THE USER SPACE
  715

*FIG. 7*

TECHNIQUES FOR DYNAMICALLY REDIRECTING DEVICE DRIVER OPERATIONS TO USER SPACE

TECHNICAL FIELD

Embodiments described herein generally relate to redirecting device driver functions to user space on computing devices. In particular, embodiments relate to redirecting binary files of device driver functions to user space for application debugging and testing tools and techniques.

BACKGROUND

A device driver is typically a relatively small piece of software that runs in the kernel space of an operating system to allow user applications to communicate with a peripheral device or hardware of a computing system. For example, printers typically come accompanied with drivers that when installed on a computing system tells the operating system exactly how to print information on a page. In another example, sound card drivers tell your software exactly how to translate data into audio signals that the card can output to a set of speakers. The same applies to video cards, keyboards, monitors, etc.

Some unique aspects of device drivers make them difficult to develop. For example, device driver are much harder to debug and test because they are generally extensions of the kernel and run in kernel space. As opposed to user applications that function in user space and have many mature debugging and testing tools, device driver debugging tools are limited. Even today, one of the most effective ways to debug a device driver is to add a line of code to print out variables or other information onto a display for a developer to see for debugging purposes. This and other techniques tend to be time consuming and not adequate for today's short development time requirements.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3 illustrates a flow diagram to redirect a device driver operation to user space.

FIG. 7 illustrates a process for device driver redirection according to one embodiment.

DETAILED DESCRIPTION

Figure 1:
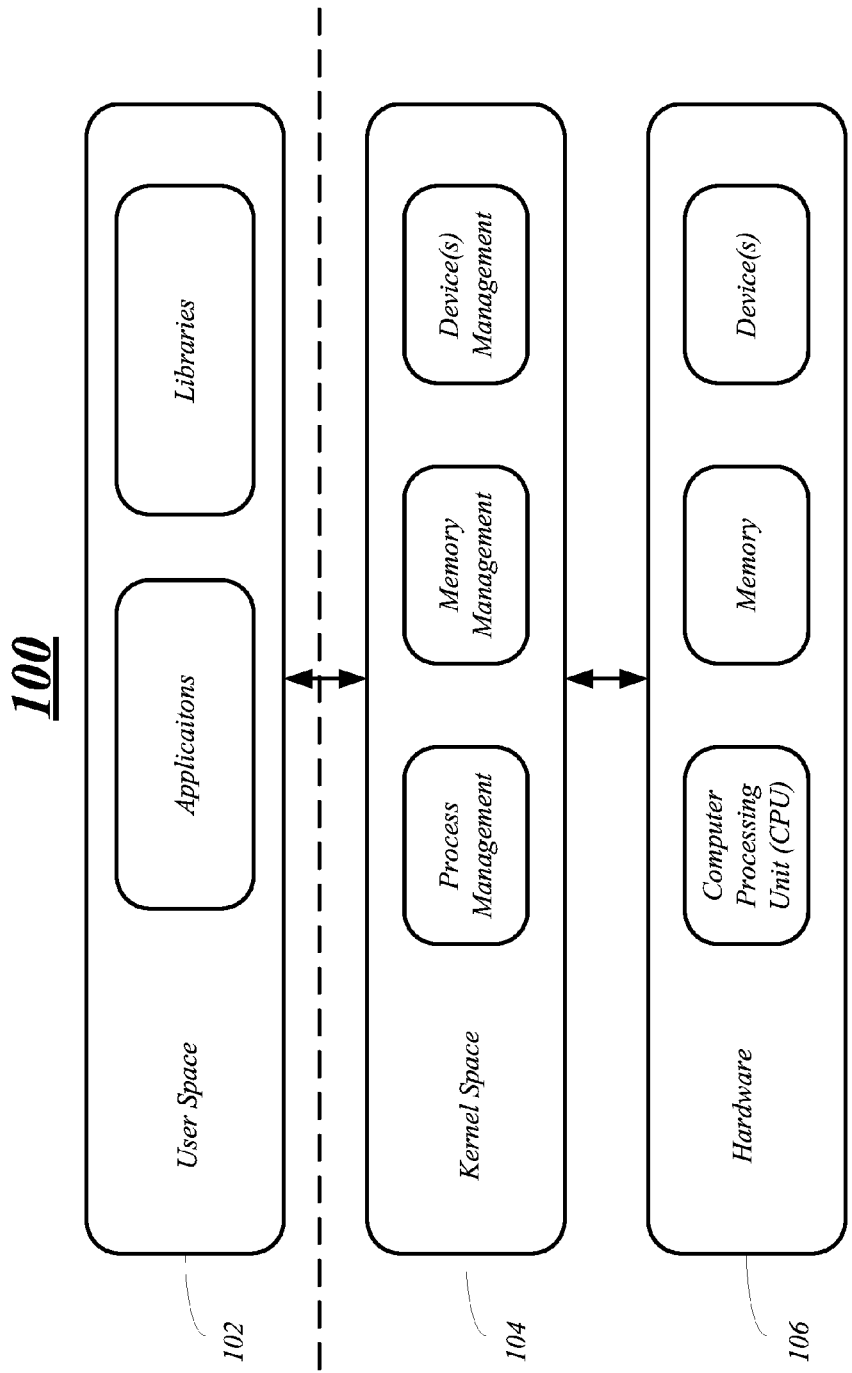
FIG. 1 illustrates a system overview of a computer system for a first embodiment.

As previously discussed, one of the main issues during device driver development is debugging and testing. In addition to having less than adequate tools for debugging, device driver errors typically cause a complete computer system to crash or fail. These errors generally require a complete system reboot to recover from the problem and add even more time to development of the driver. As with all products longer development times cause businesses to lose money. Many of these device manufactures have short time to market requirements, and thus, the development time for device drivers is an important part of the device development process.

One direction to solve these and other device driver development issues is to develop the whole device driver in user space so that device driver developers can utilize the debugging and testing tools typically associated with user space programming. Some operating systems provide user-level driver frameworks to develop device drivers. For example, Linux® and Windows® provide user-space input/output (UIO) and the user mode driver framework (UMDF), respectively. There are also some similar research projects for creating a framework to execute the device driver in user space including MicroDrivers® and Framework of User-Space Drivers® (FUSD). However, only a limited number of devices and kernel functions are supported in these frameworks and are not sufficient for quick device driver development. Moreover, these user-level driver frameworks are generally not compatible with kernel level driver frameworks. Thus, existing device drivers developed in a kernel level driver framework have to be rewritten to take advantage of these user space driver frameworks.

Another approach to support user space development of device drivers is to replicate the kernel services in the user space such that the device drivers based on kernel level driver frameworks can also run in user space. One example following this approach is the Device Driver Framework® (DDE). This approach is also not sufficient and is generally too complex because many kernel services and their application programming interfaces (APIs) change from version to version. Furthermore, many APIs of device drivers themselves can be called by other device drivers. Since they are exported by drivers themselves when the drivers are loaded, they cannot be implemented in advance in the user space environment.

These and other issues can be solved by dynamically redirecting device driver functions from the kernel space to a user process in the user space. Further, these redirected device driver functions executing in the user processes can call kernel services from the use space when required. The embodiments of device driver development described herein have many advantages of the previously discussed approaches. For example, the device drivers are developed with the original kernel driver framework, and thus, do not need to be rewritten for a different framework in user space. Moreover, only the binary files of the device driver are used during redirection, as opposed to developing the entire device driver in a user space framework. The embodiments described herein have no limitations for the redirected functions to call kernel services from the user space. Therefore, there is no rewriting of the device drivers and no additional time is spent learning a different framework.

Another advantage of the embodiments described herein is that the entire device driver does not need to run in the user space. Instead, only one or several functions of the device driver may be redirected to user processes in the user space. Furthermore, different device driver functions can be redirected to separate and different user processes. Therefore, different device driver functions can be targeted during driver development and debugging. Finally, the redirected device driver functions may be reverted back to the kernel space for execution during the debugging and development period. Thus, these flexibilities provide many different choices for developers while testing and debugging device drivers.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

FIG. 1 illustrates a general overview of an exemplary computing architecture 100 including a user space 102, a kernel space 104 and hardware 106. In general, programs or applications normally run in the user space 102 and the kernel or the core of an operating system such as Linux®, Windows®, Apple OS®, etc., runs in the kernel space 104. In various embodiments, the user space 102 may include all system resources not specifically included in kernel space 104. For example, the user space 102 may include applications for a user to use and libraries to operate the applications. Each application may include a one or more processes that are initiated in and operate in the user space. Typically, each application may be allocated physical memory or central processing unit (CPU) time, to utilize and is controlled by the kernel in the kernel space.

In various embodiments, the kernel running in the kernel space 104 controls access to components of a computing system, such as the computing processor unit (CPU), the memory, and other devices or peripherals that may be connected to or coupled with the computing system. The kernel in the kernel space 104 is the core of the operating system and normally has full access to all memory and machine hardware. Further, a device driver normally operates in the kernel space 104 and generally also has full access to system resources. In addition and as previously discussed, a device driver is typically developed in the kernel space 104. However, as discussed above, developing the device driver in the kernel space 104 has drawbacks including inadequate debugging and testing tools.

Figure 2:
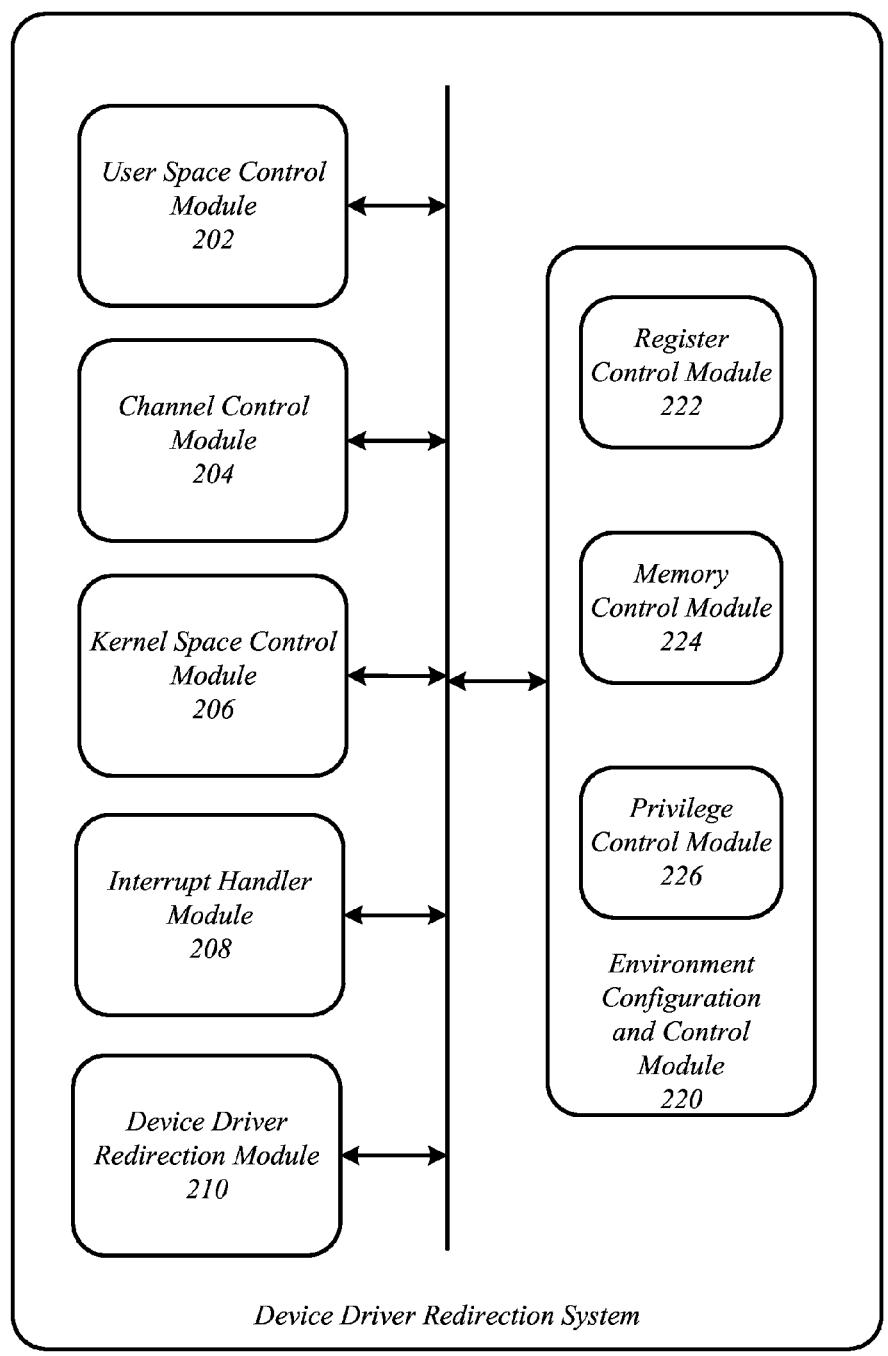
FIG. 2 illustrates an exemplary embodiment of a device driver operation redirection system.

FIG. 2 illustrates an embodiment of a device driver operation redirection system 200. The system 200 may have a number of modules to configure, monitor and control device driver function or operation or operation redirection including a user space control module 202, a channel control module 204, a kernel space control module 206, an interrupt handler module 208, a device driver redirection module 210 and an environment configuration and control module 210. Further, the environment configuration and control module 210 may include a register control module 222, a memory control module 224 and a privilege control module 226.

In various embodiments, the user space control module 202 may control and monitor various aspects of one or more instructions of the redirected device driver operation or function in user space. As will be discussed in more detail below with respect to FIG. 3, the device driver function or operation or operation will be redirected to the user space for execution by copying instructions in one or more binary files of the function or operation or operation to a user process and executing the user process in user space. The user process may be one or more processes executed in the user space by the user space control module 202 based on information received from the kernel space control module 206. The user space control module 202 may monitor and control these one or more user processes to ensure that they are executing properly. Moreover, the user space control module 202 may monitor user processors to determine if they have crashed or failed and notify the kernel space control module 206.

The user space control module 202 may also determine when the user process(es) and device driver function or operation have completed processing in the user space. In some embodiments, the user space control module 202 may send messages to the kernel space control module 206 via the channel control module 204 indicating that the user process (es) and device driver function or operation have crashed or processing has ended.

In some embodiments, the user space control module 202 may also determine and provide the interrupt handler module 208 information when an interrupt is triggered by one of the instructions of a redirected device driver function or operation. As will be discussed in more detail with respect to FIGS. 3 and 4, one or more instructions of the redirected device driver function or operation may be modified to trigger an interrupt so that they may be processed in the kernel space.

In one example, an interrupt may be generated when an instruction wants to access kernel space memory. The user space control module 202 may determine the kernel space address based on the instruction and may send the information to the interrupt handler module 208 for further processing of the instruction and the generated interrupt. In another example, a privileged instruction trying to execute in the user space may generate an interrupt. The user space control module 202 may send the privileged instruction to the interrupt handler module 208 for further processing in the kernel space. In a third example, an interrupt may be generated when an instruction calls a kernel function or operation or another device driver function or operation. The user space control module 202 may determine the address of the called function or operation based on the instruction and send the address to the interrupt handler module 208 for further processing.

In some embodiments, the address of the called function or operation may be determined directly from the instruction calling the function or operation or may need to be calculated by the user space control module 202. More specifically, if the function or operation call is a far function or operation call, such as a call to a function or operation located in a different segment than the current code segment, the instruction will contain the absolute address of this function. The absolute address of the called instruction may be sent directly to the interrupt handler module 208 without any calculation needed.

However, if the function call is a near function call, such as a call to a function within the current code segment (the segment currently pointed to by the code segment (CS) register), only the relative address is in the instruction and the address to send to the interrupt handler module 208 will need to be calculated by the user space control module 202. Moreover the current instruction pointer has been changed during the redirection of the device driver function, and therefore, the relative address in the instruction will be incorrect. However, the target address of the called function may be based on the kernel address of the redirected device driver function and the user space address of the redirected device driver function by utilizing the following formula:

$$target\_address = kernel\_address\_redirected\_function + current\_instruction\_pointer - user\_address\_redirected\_function) + relative\_address + length\_call\_instruction;$$

the target_address is the address of the function called by the redirected device driver function;

the kernel_address_redirected_function is the address of the redirected device driver function or operation in the kernel space;

the current_instruction_pointer is the current instruction pointer of the user process when the instruction initiates the function call from the EIP instruction pointer register;

the user_address_redirected_function is the address of the redirected device driver function or operation in the user space;

the relative_address is the relative address in the instruction that called the kernel or device driver function or operation; and the length_call_instruction is the total length of the call instruction.

As previously discussed, the user space control module 202 may determine the target address of the called function based on the above-recited formula and send this information to the interrupt handler module 208 for further processing.

In various embodiments, the device driver redirection system 200 may include a channel control module 204 to communicate messages and information between the various modules of the system. The channel control module 204 may also be used during debugging and testing of the device driver function or operation. For example, the channel control module 204 may determine that calls to kernel functions or other device driver functions follow the correct calling rules for the kernel services or other device driver functions and report this to the developer.

In various embodiments, the channel control module 204 may pass information in messages between the user space control module 202, the kernel space control module 206 and/or the interrupt handler module 208. The information may include address information to access kernel memory, privileged instructions for execution in the kernel space, and an address of a kernel function or operation or other device function or operation called by the redirected device driver function or operation. For example, the channel control module 204, may communicate the kernel memory address between the user space control module 202, the interrupt handler module 208, and the kernel space control module 206 when the redirected device driver function or operation tries to access kernel memory. In another example, channel control module 204, may pass a privileged instruction between the user space control module 202, the interrupt handler module 208, and the kernel space control module 206 when a privileged instruction requires execution in the kernel space. In a third example, the channel control module 204 may communicate the address of a target function called between the user space control module 202, the interrupt handler module 208, and the kernel space control module 206. Various embodiments are not limited to these examples, and the channel control module 204 may pass any information between any of the modules.

In some embodiments, the device driver redirection system 200 may include a kernel space control module 206, to manage and control various aspects of the device driver function or operation redirection and device driver function or operation processing in the kernel space. More particularly, the kernel space control module 206 include a kernel control operation that may assist in the configuring the execution environment including storing registers in memory to recover the execution environment, determine the context the in which the redirected device driver function or operation is processing in, and process actions from the interrupt handler module 208. These and other details will be discussed more specifically with respect to the flow diagrams of FIGS. 3, 4 and 5A-E.

The interrupt handler module 208 handles interrupts generated or initiated by instructions of the redirected device driver function or operation. More specifically, the interrupt handler module 208 may determine the cause of the interrupt and initiate the appropriate action to process the instruction causing the interrupt. In various embodiments, the interrupt handler module 208 may determine if the cause of the interrupt is one of the following instructions: the instruction is trying to access kernel space memory, a privileged instruction is trying to execute in user space, the instruction is a call to a kernel function or operation or another device driver function or operation, or some other type of exception.

In various embodiments, the interrupt handler module 208 may receive and pass information between the user space control module 202 and the kernel space control module 206 to process the instruction causing the interrupt. For example, the interrupt handler module 208 may receive an address of the kernel memory address, the privileged instruction, or the address of the called function or operation from the user space control module 202 and then pass this information to the kernel space control module 206 for further processing.

In addition, the interrupt handler module 208 may receive the results of the processed instruction from the kernel space control module 206 and pass the results to the user space control module 202 so that the next instruction may be processed in user space. For example, the interrupt handler module 208 may communicate the contents of the kernel memory or any return values to the user space control module 202. In some embodiments, the interrupt handler module 208 may set registers with the return value(s) and set the instruction pointer of the user process to the next instruction to be processed once the kernel space control module 206 has completed processing the action. These and other details are explained more fully with respect to FIGS. 5A-5E.

The device driver redirection module 210 may control and execute device driver redirection for one or more functions of the device driver. More specifically, the device driver redirection module 210 may make a copy of an instruction in one or more binary files of a device driver function or operation for redirection. The copy of the instruction may be copied to one or more user processes for execution in user space. Further, the device driver redirection module 210 may create or generate a function or operation to call the kernel control operation of the kernel space control module 206 to execute the device driver function or operation redirection.

In various embodiments, the generated function or operation may be called or initiated by the original instructions in binary files of the device driver function or operation for redirection. In particular, the original instructions in the binary files may be modified or changed such that the beginning instructions call or jump to the generated function or operation to stop the processing of the function or operation in the kernel space and to initiate redirection to the user space.

The device driver redirection module 210 may also determine if any of the copied instructions require an interrupt command so that control can be taken over of the instruction by the interrupt handler module 208 and the instruction can be processed by the kernel space control module 206. The device drive redirection module 210 may parse the copied instruction and determine if any of the instructions require access to kernel memory, are privileged instructions, or call a kernel function or operation or another device driver function or operation. If the device driver redirection module 210 determines that an instruction requires processing by the kernel space control module 206, the device driver redirection module 210 will change the first byte of the instruction to an interrupt command to generate an interrupt.

In one or more embodiments, the device driver function or operation for redirection cannot be executed in user space and must be executed in kernel space. For example, when a function or operation is in atomic context it must be executed in kernel space because various actions that may occur in user space cannot occur while the function or operation is executing in an atomic context. Device driver functions generally run in one of two fundamental contexts, atomic context and process context. Process context reigns when the kernel is running directly on behalf of a user-space process, the function or operation which implements system calls is one example. When the kernel is running in process context, it is allowed to go to sleep if necessary. But when the kernel is running in atomic context, things like sleeping are not allowed. Functions which handle hardware and software interrupts are examples of functions in atomic context. In these cases when the function or operation is in atomic context, the device driver redirection function or operation 210 may receive information from the kernel space control module 206 to revert the device driver function or operation back to operate in kernel space. These and other details are discussed below with respect to FIG. 3.

The device driver redirection system 200 may also include an environment configuration and control module 220 to configure the execution environment in user space for the device driver function or operation(s). The environment configuration and control module 220 may be initiated by the kernel control operation to configure the environment. To execute the one or more binary files of the device driver function or operation, the execution environment must be the same in user space as it is in kernel space. The environment configuration and control module 220 may maintain the same environment by transferring information from the kernel space to the user space for the one or more user processes. Further and as previously discussed, some instruction may be required to run in the kernel space and are handled by the interrupt handler module 208.

The executing environment includes registers, memory and privilege level(s) to be maintained. In some embodiments, the environment configuration and control module 220 may include a register control module 222 to control the registers, a memory control module 224 to control the memory, and a privilege control module 226 to control the privilege level.

With respect to the register control module 222, many registers used by the device driver must be maintained and configured by the register control module 222. These registers include general purpose registers, stack registers, segment registers and the EIP instruction pointer register.

The general purpose registers may include and are available to store any transient data required by the device driver. For example, when the device driver is interrupted its state, i.e. the value of the registers such as the program counter, instruction register or memory address register—may be saved into the general purpose registers, ready for recall when the device driver is ready to start again. These general purpose registers used to transfer parameters and return values must be stored in memory and transferred between the kernel in kernel space and the corresponding user process in user space by the register control module 222.

The register control module 222 may also maintain the stack registers the same between the kernel and the user processes by sharing the same kernel stack. The stack registers are to keep track of a call stack and include the extended stack pointer register (ESP) and the extended base pointer register (EBP). These registers may be changed during runtime or execution of the device driver and thus sharing the stack between the kernel and user process insures that the registers store the correct data. In addition, the stack registers may also store parameters and return values. In these circumstances, the parameters and return values may be transferred between the kernel and the user process.

The register control module 222 must also maintain the segment registers. Segment registers store segment values. There are four main segment registers including the code segment (CS) which contains the segment of the current instruction, the stack segment (SS) contains the stack segment, data segment (DS) is the segment used by default for most data operations, and ES is an extra segment register. These registers are usually set at the beginning and kept unchanged during the execution of the device driver. Moreover, these segment registers are maintained the same in both kernel space and user space. However, some segment registers such as the FS general purpose segment register is maintained differently in the kernel space and user space. These segment registers cannot be changed in the user space. Therefore, instructions of the device driver function or operation that utilize these segments must be interrupted, as discussed above, and run in the kernel space.

The EIP instruction pointer register stores the program counter and the current instruction address for execution. The EIP instruction pointer changes when the binary files are copied to the user process from the kernel space. Thus, functions that utilizing relative addressing and near function or operation calls need to be interrupted and controlled by the kernel space control module 206 and the interrupt handler module 208. The register control module 222 may send information including the current instruction to the user space control module 202 and the interrupt handler module 208 to determine the target address for the instruction implementing relative addressing and/or the near function or operation call.

The environment configuration and control module 220 may also include a memory control module 224 to coordinate access to the memory and input/output (I/O) ports of the computing system. There are three main parts of memory the device driver may access, the kernel memory space, the user memory space and I/O ports. All data space accessed by the redirected device driver function or operation including the stack space, the heap space, and data segments are located in the kernel memory space. The kernel memory space is shared among all user processes in the user spaces. Accessing rights must be granted to the user process to access this kernel memory space. The memory control module 224 may grant the accessing rights of the related memory pages to the corresponding user processes during execution of the redirected device driver function or operation.

In some embodiments, if a device driver function or operation is called from a user process by system calls, the user space memory of this process can be accessed in the function or operation. However, when the device driver is redirected to be executed in another user process, the user space can longer be accessed because the process context has changed. In some instances, the memory control module 224 may use special kernel application programming interfaces (APIs), e.g. copy_from_user and copy_to_user, for manipulating user memory of the caller process. When these functions are called from the redirected functions an interrupt can be generated and the original process context can be used for execution in the kernel space.

With respect to I/O ports, these instructions are typically not permitted to be executed in user processes. However, permission may be granted by the memory control module 224 operating with root access and utilizing system calls such as ioperm to set port input/output permissions and iopl to change I/O privilege level to allow one or more user processes access to an I/O port. Thus, the memory control module 224 may utilize these system calls when instructions accessing I/O ports are executed.

The environment configuration and control module 220 may include a privilege control module 226 to manage instructions of the redirected device driver function or operation that are privileged. Generally, the privilege level of a user process in user space is lower than the privilege level of the kernel space. Therefore, privileged instructions requiring a higher privilege level than what the user process is operating in will generate an interrupt and will be executed by the kernel space control module 206, as previously discussed. The privilege control module 226 may provide these instructions to the user space control module 202 and the interrupt handler module 208 during execution for further processing.

FIG. 3 illustrates a process flow diagram 300 for a device driver function or operation redirection in an exemplary embodiment. As previous discussed, device driver functions may be dynamically redirected during a debugging and testing phase of driver development. In various embodiments, instructions in a binary file of one or more device driver functions may be redirected from the kernel space to the user space while utilizing a user process as shown in process flow 300. More specifically, a start address and a length of a device driver function to be redirected to the user space may be looked up in a table at block 305. Moreover, the kernel address and user address for the redirected function may be determined by looking up the information in a table by utilizing the current instruction pointer. Further, at block 305, a copy of instructions in one or more binary files associated with the device driver function for redirection may be copied to a user process for operation in the user space.

At block 310, a function or operation may be generated to call a kernel control operation. The generated function or operation may be a temporary function or operation that calls the kernel control operation with the processing identification (ID) of the user process the one or more binary files were copied to in block 305 as parameter. In addition, the generated function or operation may also include the redirected device driver function or operation address in user space as a parameter when calling the kernel control operation. The redirected device driver function or operation address in user space may be based on and determine from the user process.

At block 315, the beginning instructions of the original binary file in the kernel space may be saved in memory and changed to instructions to jump to or call the generated function or operation of block 310. For example, the instructions may be changed to a jump (JMP) command. Thus, when the original binary file is called or initiated in the kernel space the generated function or operation is called to initiate the device driver function or operation in user space instead of proceeding with the device driver function or operation executing in the kernel space. Furthermore, the original instructions of the binary file may be saved for later use, such as, when the redirected device driver function or operation is reverted back to the kernel space.

At block 320, the copied binary file may be analyzed to determine if any of the instructions require handling by the interrupt handler module. For example, redirected device driver instructions that request access to kernel memory may be handled by the interrupt handler module. In another example, a privilege instruction of the redirected device driver instructions requires execution in the kernel space and thus must be handled by the interrupt handler module. In a third example, an instruction calling a kernel function or operation or another device driver function or operation may also require handling by the interrupt handler module. These and other details will be discussed further with respect to FIGS. 5A-5E.

Once an instruction is determined to require interrupt handling, the instruction may be stored in memory and one or more bytes of the instruction of the function or operation may be changed to initiate a interrupt. For example, the first byte of the instruction may be changed to Interrupt 3 (INT3) command, wherein the INT3 instruction is used for executing a software-generated call to an interrupt handler module 208.

Once block 320 completes, the device driver function or operation may be redirected to a user process and is ready for execution in the user space. However, in some embodiments, the redirected device driver function or operation may be reverted back to the kernel space for execution. For example, the device driver function or operation may be an atomic context and requires execution in the kernel space. Thus, optional block 325 may be implemented to revert the redirected device driver function or operation back to the kernel space for execution. More specifically, the stored instructions of the original binary file in the kernel space may be restored from memory and the original binary file of the device driver function or operation may be permitted to execute in the kernel space.

Figure 4:
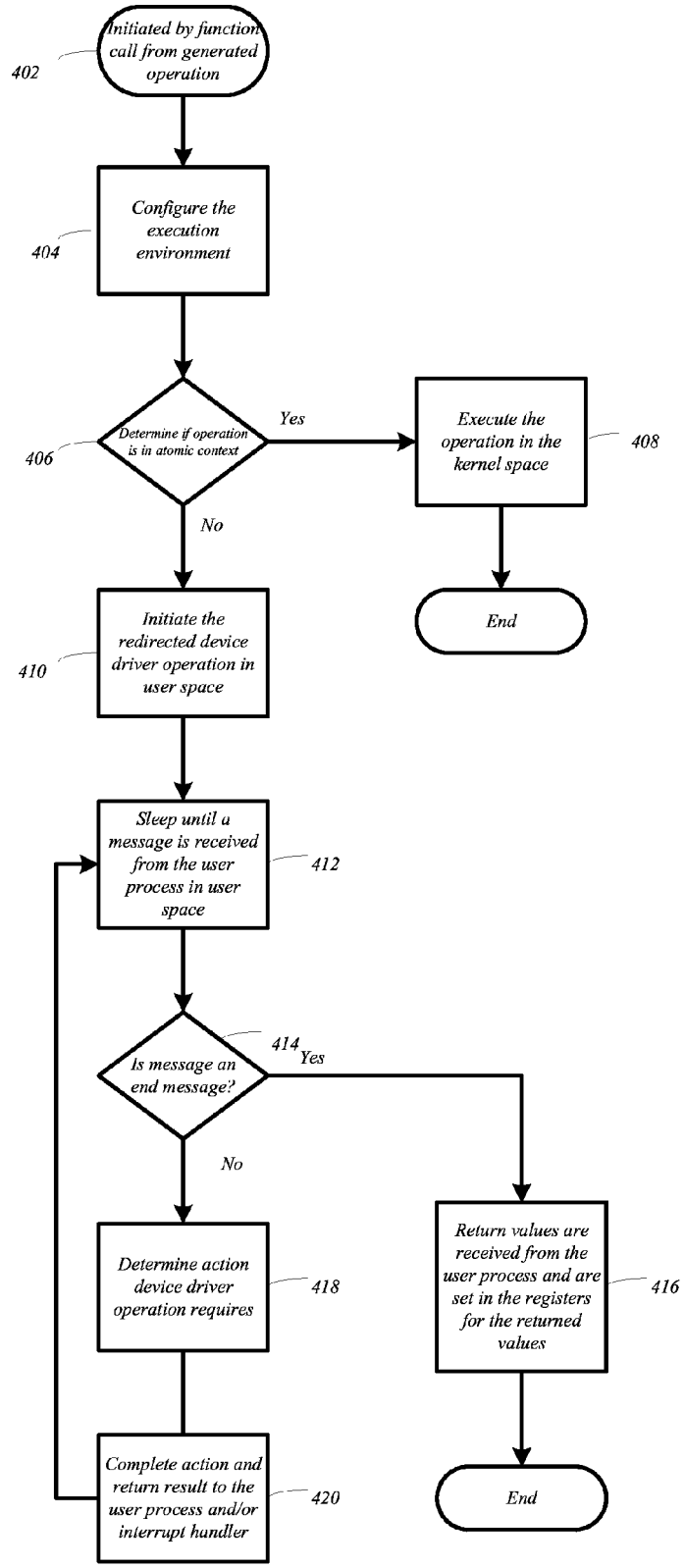
FIG. 4 illustrates a flow diagram to control a redirection and execution of a device driver operation in user space.
Figure 5A:
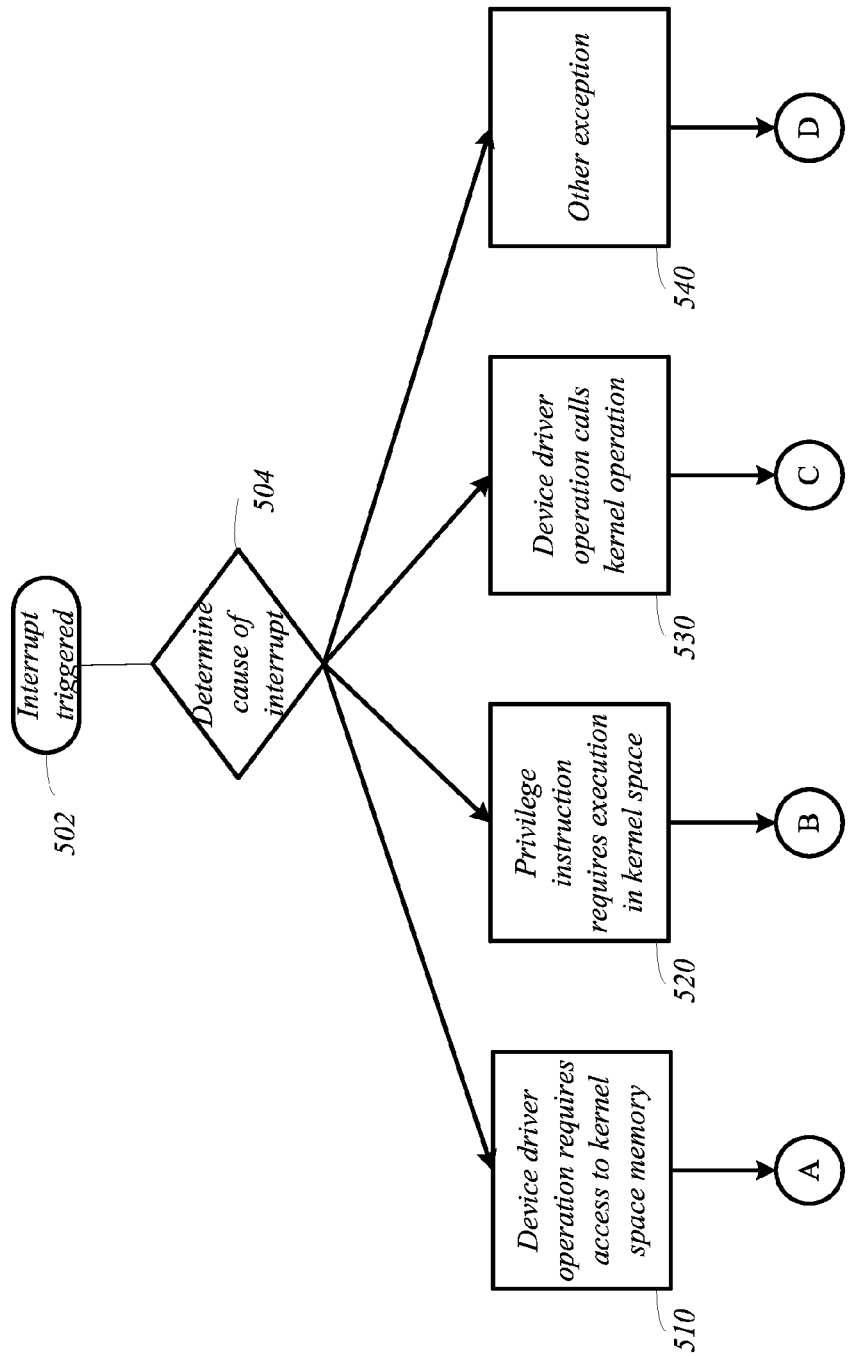
FIGS. 5A-5E illustrate a flow diagram for handling an interrupt for a redirected device driver operation.
Figure 5B:
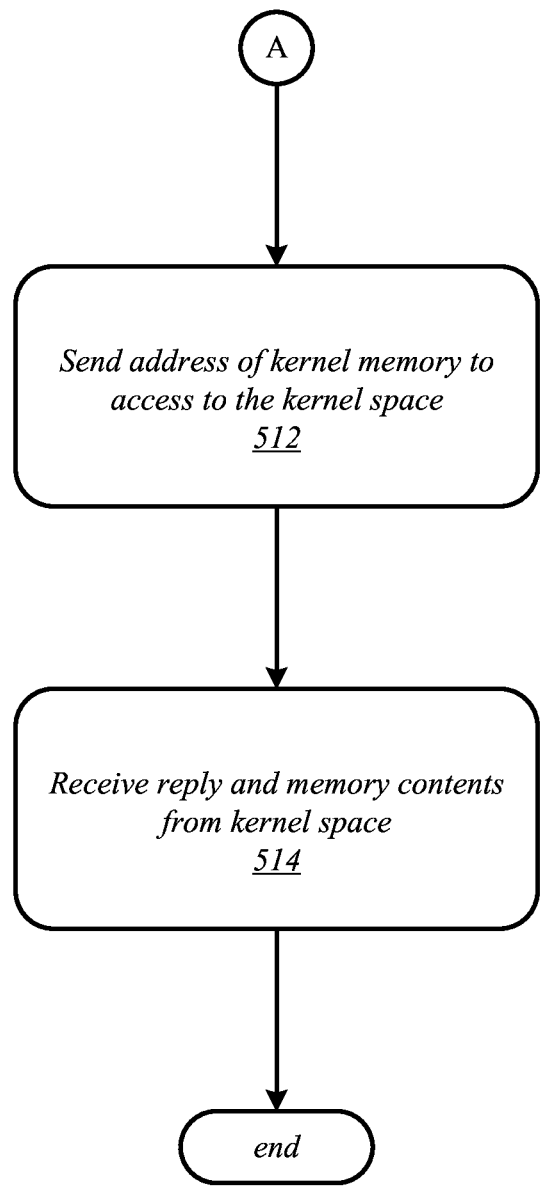
Figure 5C:
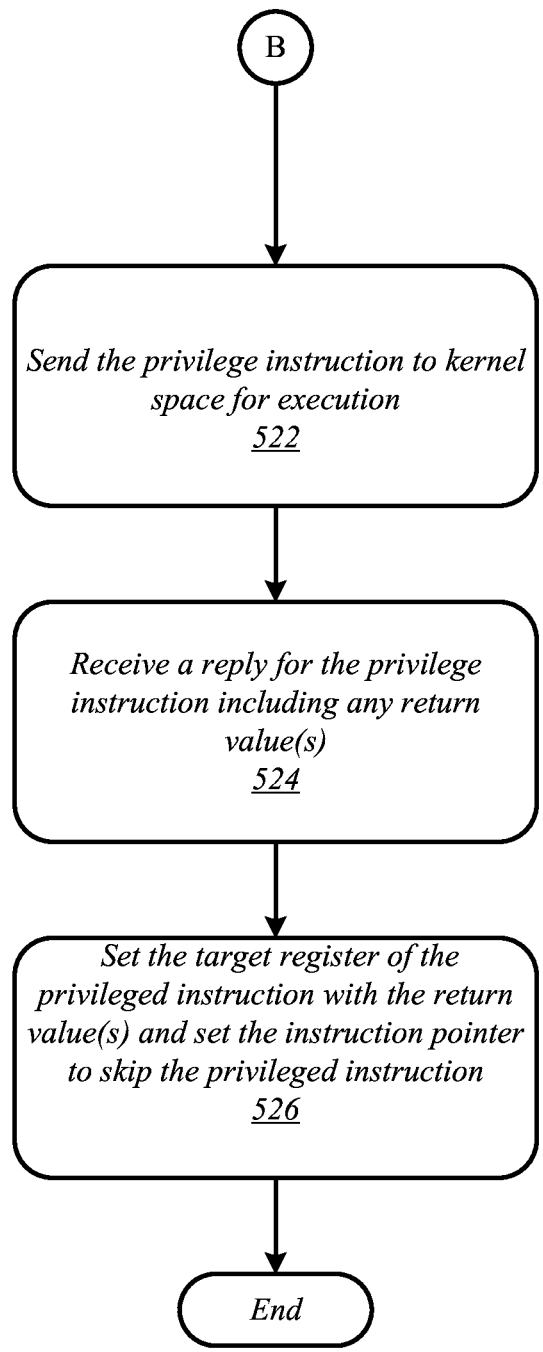
Figure 5D:
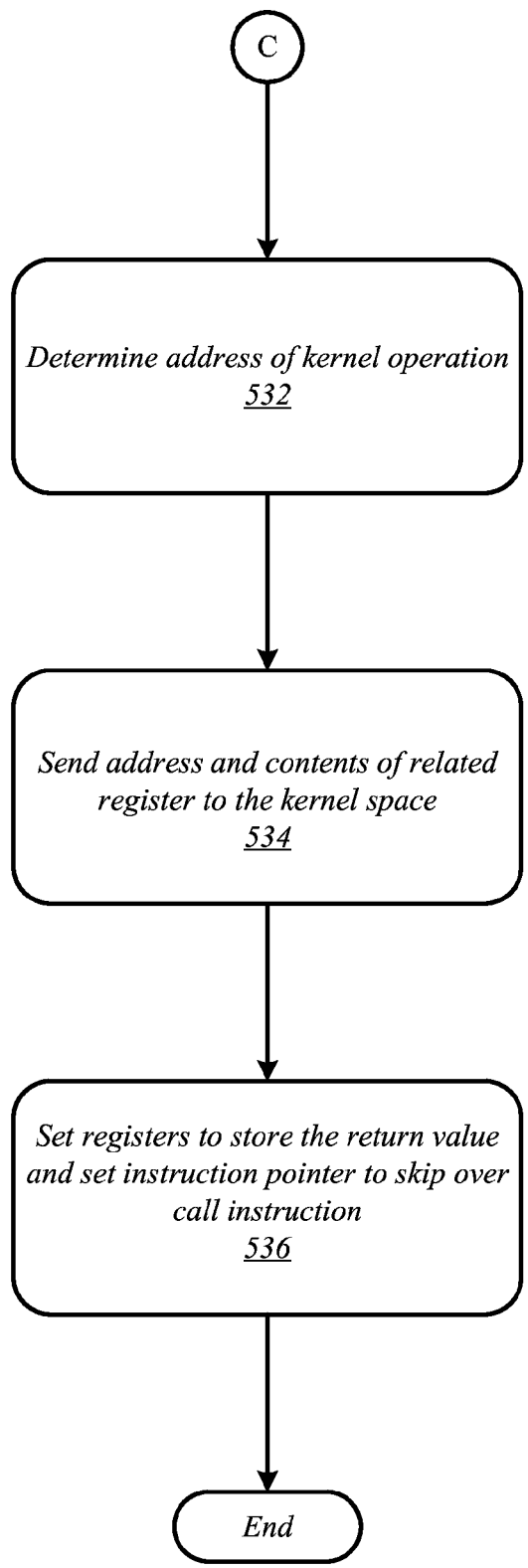
Figure 5E:
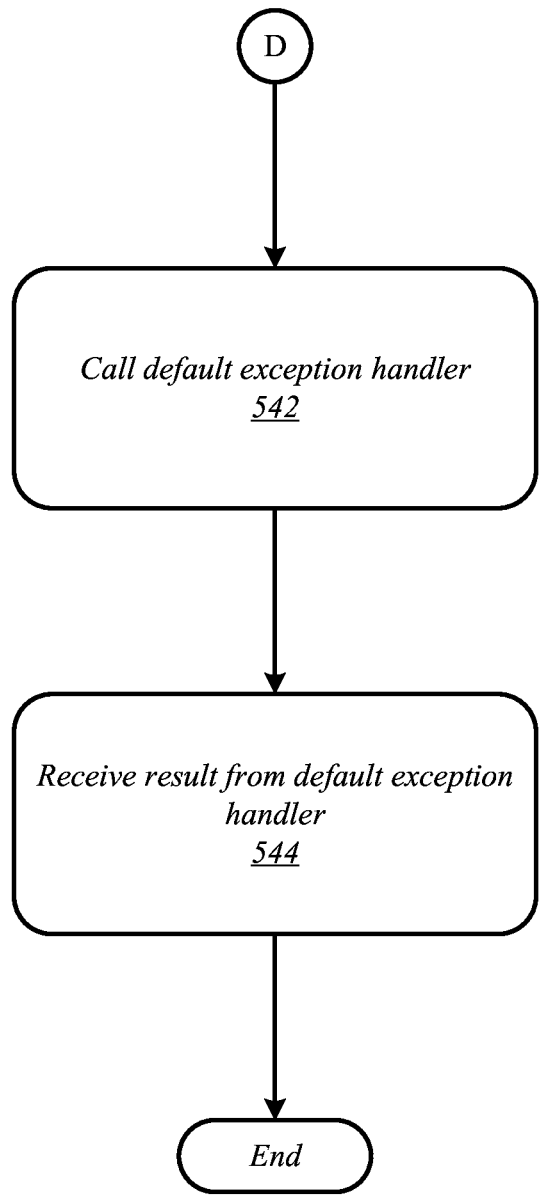

FIG. 4 illustrates a flow diagram for a kernel control operation for the redirected device driver function or operation. In various embodiments, the kernel control operation may be part of the kernel control module 206. However, various embodiments are not limited in this manner, and the kernel control operation may be part of any module and executed by a processor component. The kernel control operation may be used to control various aspect of the redirected device driver function or operation, as will be discussed below. The kernel control operation may be initiated by a function or operation call from the generated function or operation discussed above with respect to block 310 of FIG. 3. The generated function or operation may call and the kernel control operation may be initiated with the process ID of the user process of the redirected device driver function or operation and the redirected device driver function or operation user space address as parameters at block 402.

In some embodiments, the execution environment, in the user space, may be configured to execute the redirected device driver function or operation at block 404 by utilizing the environment configuration and control module 220. In some embodiments, the execution environment may be configured at any time before the execution of the redirected device driver function or operation in the user space including before the initiating of the kernel control operation. As part of the execution environment configuration process, register information, memory information, and privilege level information may be determined, configured and stored, as discussed in more detail with respect to the environment configuration and control module 220.

At block 406, the context of the redirected device driver function or operation is determined. More specifically, if the redirected device driver function or operation is in an atomic context, the redirected device driver function or operation is reverted back to execute in the kernel space at block 408. However, if the redirected device driver function or operation is in a process context the driver function or operation is initiated in the user space at block 410.

Once the redirected device driver function or operation is initiated and executing in the user space, the kernel control operation may enter a sleep state and wait for a message from the user process in the user space. As previously discussed, the user process and user space may be controlled and managed by the user space control module 202. Therefore, the kernel control operation may receive a message from the user space control module 202 via the channel control module 204. The message may include information to initiate an action for the kernel control operation to respond to or an end message indicating that the redirected device driver function or operation execution has completed.

At block 414, if the message includes information indicating that it is a end message, the returned values from the user space control module 202 and user process are received by the kernel space control space 206 and are set in their corresponding registers used to store the return values at block 416.

However if the message includes information indicating that it is an action message or not an end message at block 414, the kernel control operation determines the action that needs to be taken and completes the action. For example, the action message may have been received based on an interrupt generated by an instruction executing in the user space. The action message may indicate that the redirected device driver function or operation wishes to access kernel memory, execute a privileged instruction in user space or is a kernel function or operation call. Moreover, the kernel control operation in the kernel space control module 206, may receive information from the interrupt handler module 208 and may complete the action based on the information. Further, the kernel control operation may return the results of the action to the user process and/or interrupt handler module 208.

In various embodiments, the kernel control operation may receive information from the interrupt handler module 208 indicating that the redirected device driver function or operation desires to access kernel memory, for example. The information from the interrupt handler module 208 may include the address of the location in the kernel memory to be accessed. The kernel control operation may access the kernel memory at the address, retrieve its contents, and send the contents back to the interrupt handler module 208 and user space control module 202 for further processing.

In another example, the kernel control operation may receive information from the interrupt handler module 208 indicating that an instruction of the redirected device driver function or operation is a privileged instruction and requires execution in the kernel space. The kernel control operation may receive the privileged instruction from the interrupt handler and execute the privileged instruction in the kernel space. Further, the kernel control operation may send a reply to the interrupt handler 208 indicating the processing of the privileged instruction has completed.

In a third example, the kernel control operation may receive information indicating an instruction of the redirected device driver function or operation is calling a kernel function or operation. The kernel control operation may receive the address of the called kernel function or operation and the contents of the related registers from the interrupt handler module 208 and call the kernel function or operation. Further, the kernel control operation may send a reply to the interrupt handler module 208 indicating that the kernel function or operation has been called and completed. Various embodiments are not limited to the above-discussed examples. The kernel control operation may receive other messages and may determine and complete other actions required by the redirected device driver function or operation.

FIGS. 5A-5E illustrate an exemplary process flow for handling an interrupt and references the interrupt handler module 208 discussed with respect to FIG. 2. As previously discussed, various instructions may require special processing and therefore are manipulated such that they generate an interrupt. More specifically, the first byte or bytes of the instruction may be changed to the INT3 instruction so that an interrupt is generated and can be handled by the interrupt handler module 208. At block 502, an interrupt is triggered by an instruction initiating the interrupt handler module 208. The interrupt handler module 208 may determine the cause of the interrupt based on the instruction for processing.

At block 510, the interrupt handler module 208 may determine that the redirected device driver function or operation requires access to kernel space memory. The interrupt handler module 208 may then send the address of the kernel space memory for access to the kernel control operation via the channel control module 204 and wait for a reply from the kernel control operation at block 512. At block 514, the interrupt handler module 208 may receive a reply from the kernel control operation including the memory contents of the kernel memory at the address from the kernel control module. The interrupt may then allow the user space control module 202 and user process to continue to the next instruction for processing of the redirected device driver function or operation.

At block 520, the interrupt handler module 208 may determine that an instruction of the redirected device driver function or operation is a privileged instruction and requires processing by in the kernel space. At block 522, the interrupt handler module 208 may send the privilege instruction to the kernel space for execution by the kernel control operation via the channel control module 204. The interrupt handler module 208 may receive a reply from the kernel control operation including any return value(s)s and an indication that the privileged instruction has been processed in the kernel space at block 524. At block 526, the interrupt handler module 208 may set the target register of the privileged instruction with the return value(s). Further, at block 526, the interrupt handler module 208 may set the current instruction pointer of the redirected device driver function or operation to skip over the privileged instruction and the user process may proceed with processing the function or operation.

In various embodiments at block 530, the interrupt handler module 208 may determine that an instruction of the redirected device driver function or operation has called a kernel function or operation or another device driver function or operation. At block 532, the interrupt handler module 208 determines the address of the target kernel function or operation or the other device driver function or operation that is called based on the instruction. The interrupt handler module 208 then sends the kernel address and the contents of related registers to the kernel space, and in particular, the kernel control operation for processing at block 534. The interrupt handler module 208, at block 536, receives a reply from the kernel control operation, sets the registers to store the return value(s) and sets the instruction pointer to skip over the call instruction of the redirected device driver function or operation.

At block 540, the interrupt handler module 208 may determine that an instruction of the redirected device driver function or operation has generated a default interrupt or exception to be handled by the regular interrupt or exception handler. At block 542, the interrupt handler module 208 calls the default interrupt or exception handler (based on the cause of the interrupt) with information from the instruction. The interrupt handler module 208 receives a result from the default interrupt or exception handler at block 544.

Figure 6:
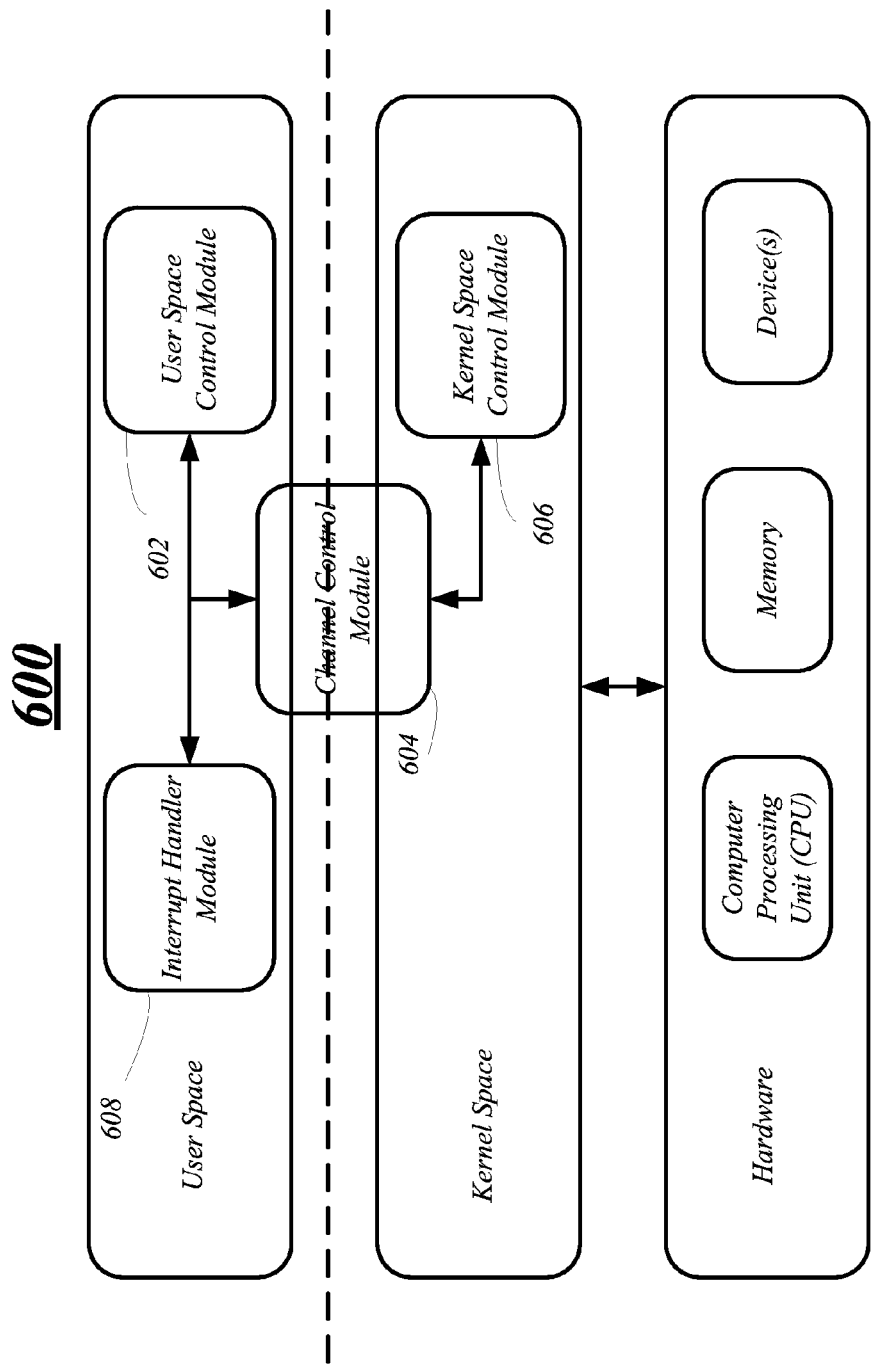
FIG. 6 illustrates an embodiment of a computer system with message channel control.

FIG. 6 illustrates a system 600 for communicating messages between a user space control module 602, a kernel space control module and a interrupt handler module 608 via a channel control module 604. The modules of system 600 may be the same modules with corresponding names as illustrated in FIG. 2. In various embodiments, the channel control module 604 may communicate messages and information between the user space and kernel space including messages generated in the user space by the interrupt handler module 608 and user space control module 602 to the kernel space control module 606. For example, the user space control module 602 may send messages to the kernel space control module 606 via the channel control module 604 indicating that the user process(es) and device driver function or operation have crashed or processing has ended.

In various embodiments, information communicated between the modules may include address information to access kernel memory, privileged instructions for execution in the kernel space, and an address of a kernel function or operation or other device function or operation called by the redirected device driver function or operation. For example, the channel control module 604, may communicate the kernel memory address between the user space control module 602, the interrupt handler module 608, and the kernel space control module 606 when the redirected device driver function or operation tries to access kernel memory. In another example, channel control module 604, may pass a privileged instruction between the user space control module 602, the interrupt handler module 608, and the kernel space control module 606 when a privileged instruction requires execution in the kernel space. In a third example, the channel control module 604 may communicate the address of a target function or operation called between the user space control module 602, the interrupt handler module 608, and the kernel space control module 606. In another example, the channel control module 604 may communicate replies and return values from the kernel space control module 608 to the interrupt handler module 608 and the user space control module 602. Various embodiments are not limited to these examples, and the channel control module 604 may pass any information between any of the modules. Moreover, FIG. 6 illustrates modules operating or executing in the user space or kernel space. However, the modules are not limited in this manner and all or portions of the modules may execute in either the user space or the kernel space.

FIG. 7 illustrates an embodiment of logic flow 700. The logic flow 700 may be representative of some or all of the operations executed by one or more embodiments described herein. For example, the logic flow 700 may illustrate operations performed by the systems 100, 200 and 600.

In the illustrated embodiment shown in FIG. 7, the logic flow 700 may include configuring an execution environment in a user space for device driver functions including storing information in memory for the execution at block 705. In various embodiments, contents of one or more registers may be transferred to a user process in a user space and access may be granted to user space memory, kernel space memory and I/O ports while configuring the execution environment.

At block 710, the logic flow 700 may include redirecting a device driver function or operation to the execution environment in the user space for execution including copying instructions of the device function or operation from the kernel space to a user process in the user space. Moreover, the device driver function or operation may include one or more instructions in one or more binary files and the binary files may be copied to a user process for execution in the user space.

The logic flow 700 may also include executing the redirected device driver function or operation in the execution environment in the user space. The original device driver function or operation in the kernel space may be modified such that the first few instructions are changed to call a generated function or operation. The generated function or operation may call a kernel control operation of a kernel space control module to monitor and execute any processing required by the redirected device driver function or operation. The kernel control operation may initiate the redirected function or operation device driver by passing the start address of the redirected device function or operation and corresponding stored registers to a user space control module for execution of one or more user process.

Figure 8:
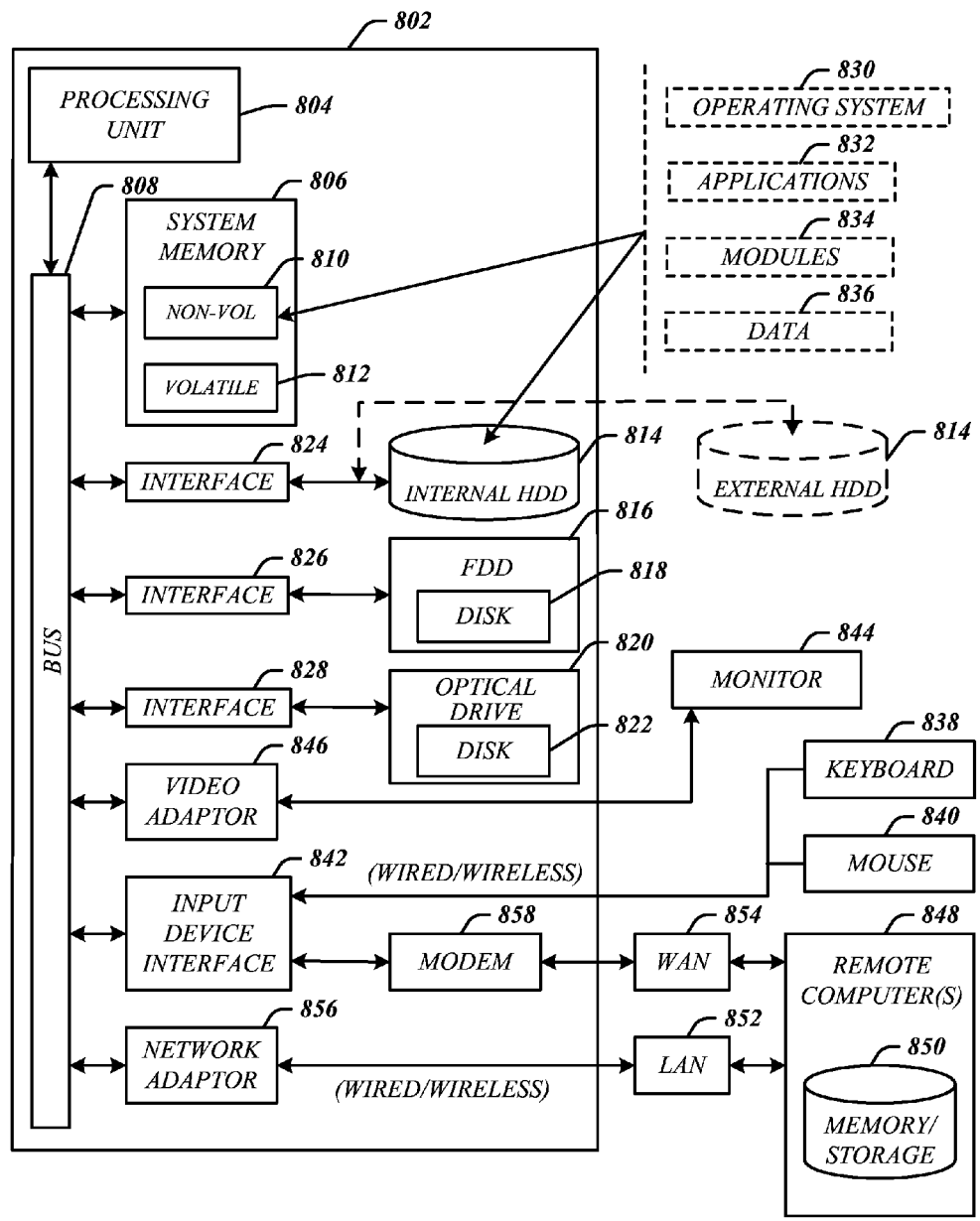
FIG. 8 illustrates an embodiment of a first computing architecture.

FIG. 8 illustrates an embodiment of an exemplary computing architecture 800 suitable for implementing various embodiments as previously described. In one embodiment, the computing architecture 800 may comprise or be implemented as part of computing system, such as computing system 200.

As used in this application, the terms "system", "module" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of a system.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the computing devices as previously described with reference to FIGS. 1-8 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through fifty (1-50) provided below are intended to be exemplary and non-limiting.

In a first example, an apparatus may include a processor component and an environment configuration and control module for execution on the processor component to configure an execution environment in a user space for device driver operation. The apparatus may also include a device driver redirection module for execution on the processor component to redirect a device driver operation to the execution environment in the user space for execution including copying instructions of the device driver operation from the kernel space to a user process in the user space, and a user space control module for execution on a processor component to execute the redirected device driver operation in the execution environment in the user space.

In a second example and in furtherance of the first example, an apparatus may include storing information for the execution environment, the information comprising one or more of register information, memory information, and privilege information, and the configuring comprising transferring the stored information from the kernel space to the user process of the user space for execution of the redirected device driver operation.

In a third example and in furtherance of any of the previous examples, an apparatus may include the device driver redirection module to generate an operation to call a kernel control operation with a process identification (ID) of the user process and a redirected operation address for the redirected device driver operation and to change one or more of the instructions in the kernel space to initiate the generated operation.

In a fourth example and in furtherance of any of the previous examples, an apparatus may include the device driver redirection module to determine when copied instructions require handling in the kernel space and to assign an interrupt to the copied instructions to create an exception.

In a fifth example and in furtherance of any of the previous examples, an apparatus may include a kernel space control module for execution on the processor component including the kernel control operation to receive a call message from the created operation with the process ID and the redirected operation address, and the user space control module to execute the redirected device driver operation in the user space based on the process ID and the redirected operation address received from the kernel control operation.

In a sixth example and in furtherance of any of the previous examples, an apparatus may include a kernel space control module including a kernel control operation to determine when the redirected device driver operation is in an atomic context, and to execute the device driver operation in the kernel space.

In a seventh example and in furtherance of any of the previous examples, an apparatus may include an interrupt handler module for execution on the processor component to receive an interrupt when one of the copied instructions requires handling in the kernel space.

In an eighth example and in furtherance of any of the previous examples, an apparatus may include the interrupt handler module to determine when a kernel operation or device driver operation is called by the redirected device driver operation based on the interrupt, and to send a call message to call the kernel operation or the device driver operation from the kernel space based on the determination.

In a ninth example and in furtherance of any of the previous examples, an apparatus may include the interrupt and exception handling module to determine the redirected device driver operation requires access to kernel memory based on the interrupt, and to send an address to access the kernel memory from the kernel space and to receive contents of the kernel memory.

In a tenth example and in furtherance of any of the previous examples, an apparatus may include the interrupt and exception handling module to determine the copied instruction is a privileged instruction requiring execution in the kernel space based on the interrupt, and to send a message to a kernel space control module to execute the privileged instruction in the kernel space.

In eleventh example and in furtherance of any of the previous examples, an article comprising a computer-readable storage medium comprising instructions that when executed enable a computing device to, configure an execution environment in a user space for device driver operations, redirect a device driver operation to the execution environment in the user space for execution including copying instructions of the device driver operation from the kernel space to a user process in the user space, and execute the redirected device driver operation in the execution environment in the user space.

In a twelfth example and in furtherance of any of the previous examples, an article comprising a computer-readable storage medium comprising instructions that when executed enable a computing device to store instructions for an execution environment, the information may include one or more of register information, memory information, and privilege information, and to transfer the stored information from the kernel space to the user process of the user space for execution of the redirected device driver operation.

In a thirteenth example and in furtherance of any of the previous examples, an article comprising instructions that when executed enable the computing device to generate an operation to call a kernel control operation with a process identification (ID) of the user process and a redirected operation address for the redirected device driver operation and to change one or more of the instructions in the kernel space to initiate the generated operation.

In a fourteenth example and in furtherance of any of the previous examples, an article comprising instructions that when executed enable the computing device to determine when copied instructions require handling in the kernel space and to assign an interrupt to the copied instructions to create an exception.

In a fifteenth example and in furtherance of any of the previous examples, an article comprising instructions that when executed enable the computing device to receive a call message from the created operation with the process ID and the redirected operation address and execute the redirected device driver operation in the user space based on the process ID and the redirected operation address received from the kernel control operation.

In a sixteenth example and in furtherance of any of the previous examples, an article comprising instructions that when executed enable the computing device to determine when the redirected device driver operation is in an atomic context, and to execute the device driver operation in the kernel space.

In a seventeenth example and in furtherance of any of the previous examples, an article comprising instructions that when executed enable the computing device to receive an interrupt when one of the copied instructions requires handling in the kernel space.

In a eighteenth example and in furtherance of any of the previous examples, an article comprising instructions that when executed enable the computing device to determine when a kernel operation or device driver operation is called by the redirected device driver operation based on the interrupt, and to send a call message to call the kernel operation or the device driver operation from the kernel space based on the determination.

In a nineteenth example and in furtherance of any of the previous examples, an article comprising instructions that when executed enable the computing device to determine the redirected device driver operation requires access to kernel memory based on the interrupt, and to send an address to access the kernel memory from the kernel space and to receive contents of the kernel memory.

In a twentieth example and in furtherance of any of the previous examples, comprising instructions that when executed enable the computing device to determine the copied instruction is a privileged instruction requiring execution in the kernel space based on the interrupt, and to send a message to a kernel space control module to execute the privileged instruction in the kernel space.

In a twenty-first example and in furtherance of any of the previous examples, a computer-implemented method may comprise configuring an execution environment in a user space for device driver operations, redirecting a device driver operation to the execution environment in the user space for execution including copying instructions of the device driver operation from the kernel space to a user process in the user space and executing the redirected device driver operation in the execution environment in the user space.

In a twenty-second example and in furtherance of any of the previous examples, a computer-implemented method may comprising storing information for the execution environment, the information comprising one or more of register information, memory information, and privilege information, and transferring the stored information from the kernel space to the user process of the user space for execution of the redirected device driver operation.

In a twenty-third example and in furtherance of any of the previous examples, a method may include generating a operation to call a kernel control operation with a process identification (ID) of the user process and a redirected operation address for the redirected device driver operation and to change one or more of the instructions in the kernel space to initiate the generated operation.

In a twenty-fourth example and in furtherance of any of the previous examples, a method may include determining when copied instructions require handling in the kernel space and to assign an interrupt to the copied instructions to create an exception.

In a twenty-fifth example, a method may include receiving a call message from the created operation with the process ID and the redirected operation address and executing the redirected device driver operation in the user space based on the process ID and the redirected operation address received from the kernel control operation.

In a twenty-sixth example and in furtherance of any of the previous examples, a method may include determining when the redirected device driver operation is in an atomic context, and to execute the device driver operation in the kernel space.

In a twenty-seventh example and in furtherance of any of the previous examples, a method may include receiving an interrupt when one of the copied instructions requires handling in the kernel space.

In a twenty-eighth example and in furtherance of any of the previous examples, a method may include determining when a kernel operation or device driver operation is called by the redirected device driver operation based on the interrupt, and to send a call message to call the kernel operation or the device driver operation from the kernel space based on the determination.

In a twenty-ninth example and in furtherance of any of the previous examples, a method may include determining the redirected device driver operation requires access to kernel memory based on the interrupt, and to send an address to access the kernel memory from the kernel space and to receive contents of the kernel memory.

In a thirtieth example and in furtherance of any of the previous examples, a method may include determining the copied instruction is a privileged instruction requiring execution in the kernel space based on the interrupt, and to send a message to a kernel space control module to execute the privileged instruction in the kernel space.

In a thirty-first example and in furtherance of any of the previous examples, an apparatus, may comprise means for configuring an execution environment in a user space for device driver operations, means redirecting a device driver operation to the execution environment in the user space for execution including copying instructions of the device driver operation from the kernel space to a user process in the user space and means for executing the redirected device driver operation in the execution environment in the user space.

In a thirty-second example and in furtherance of any of the previous examples, an apparatus may comprise means for storing information for the execution environment, information comprising one or more of register information, memory information, and privilege information, and the means for configuring comprising means for transferring the stored information from the kernel space to the user process of the user space for execution of the redirected device driver operation.

In a thirty-third example and in furtherance of any of the previous examples, an apparatus means for generating a operation to call a kernel control operation with a process identification (ID) of the user process and a redirected operation address for the redirected device driver operation and means for changing one or more of the instructions in the kernel space to initiate the generated operation.

In a thirty-fourth example and in furtherance of any of the previous examples, an apparatus may comprise means for receiving a call message from the created operation with the process ID and the redirected operation address and means for executing the redirected device driver operation in the user space based on the process ID and the redirected operation address received from the kernel control operation.

In a thirty-fifth example and in furtherance of any of the previous examples, an apparatus may comprise means for receiving a call message from the created operation with the process ID and the redirected operation address and means for executing the redirected device driver operation in the user space based on the process ID and the redirected operation address received from the kernel control operation.

In a thirty-sixth example and in furtherance of any of the previous examples, an apparatus may comprise means for determining when the redirected device driver operation is in an atomic context, and to execute the device driver operation in the kernel space.

In a thirty-seventh example and in furtherance of any of the previous examples, an apparatus may comprise means for receiving an interrupt when one of the copied instructions requires handling in the kernel space.

In a thirty-eighth example and in furtherance of any of the previous examples, an apparatus may comprise means for determining when a kernel operation or device driver operation is called by the redirected device driver operation based on the interrupt and means for sending a call message to call the kernel operation or the device driver operation from the kernel space based on the determination.

In a thirty-ninth example and in furtherance of any of the previous examples, an apparatus may comprise means for determining the redirected device driver operation requires access to kernel memory based on the interrupt and means for sending an address to access the kernel memory from the kernel space and to receive contents of the kernel memory.

In a fortieth example and in furtherance of any of the previous examples, an apparatus may comprise means for determining the copied instruction is a privileged instruction requiring execution in the kernel space based on the interrupt and means for sending a message to a kernel space control module to execute the privileged instruction in the kernel space.

In a forty-first example and in furtherance of any of the previous examples, a computing device to redirect device driver operation may comprise a processor component, an environment configuration and control module for execution on the processor component to configure an execution environment in a user space for device driver operations, a device driver redirection module for execution on the processor component to redirect a device driver operation to the execution environment in the user space for execution including copying instructions of the device driver operation from the kernel space to a user process in the user space and a user space control module for execution on a processor component to execute the redirected device driver operation in the execution environment in the user space.

In a forty-second example and in furtherance of any of the previous examples, a computing device may comprise the environment configuration and control module to store information for the execution environment, the information comprising one or more of register information, memory information, and privilege information, and the environment configuration and control module to transfer the stored information from the kernel space to the user process of the user space for execution of the redirected device driver operation.

In a forty-third example and in furtherance of any of the previous examples, a computing device may comprise the device driver redirection module to generate an operation to call a kernel control operation with a process identification (ID) of the user process and a redirected operation address for the redirected device driver operation and to change one or more of the instructions in the kernel space to initiate the generated operation.

In a forty-fourth example and in furtherance of any of the previous examples, a computing device may comprise the device driver redirection module to determine when copied instructions require handling in the kernel space and to assign an interrupt to the copied instructions to create an exception.

In a forty-fifth example and in furtherance of any of the previous examples, a computing device may comprise a kernel space control module for execution on the processor component including the kernel control operation to receive a call message from the created operation with the process ID and the redirected operation address and the user space control module to execute the redirected device driver operation in the user space based on the process ID and the redirected operation address received from the kernel control operation.

In a forty-sixth example and in furtherance of any of the previous examples, a computing device may comprise a kernel space control module including a kernel control operation to determine when the redirected device driver operation is in an atomic context, and to execute the device driver operation in the kernel space.

In a forty-seventh example and in furtherance of any of the previous examples, a computing device may comprise an interrupt handler module for execution on the processor component to receive an interrupt when one of the copied instructions requires handling in the kernel space.

In a forty-eighth example and in furtherance of any of the previous examples, a computing device may comprise the interrupt handler module to determine when a kernel operation or device driver operation is called by the redirected device driver operation based on the interrupt, and to send a call message to call the kernel operation or the device driver operation from the kernel space based on the determination.

In a forty-ninth example and in furtherance of any of the previous examples, a computing device may comprise the interrupt and exception handling module to determine the redirected device driver operation requires access to kernel memory based on the interrupt, and to send an address to access the kernel memory from the kernel space and to receive contents of the kernel memory.

In a fiftieth example and in furtherance of any of the previous examples, a computing device may comprise the interrupt and exception handling module to determine the copied instruction is a privileged instruction requiring execution in the kernel space based on the interrupt, and to send a message to a kernel space control module to execute the privileged instruction in the kernel space.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a processor component;
   an environment configuration and control module for execution on the processor component to configure an execution environment in a user space for device driver operations to perform debugging and testing;
   a device driver redirection module for execution on the processor component to:
      redirect a device driver operation for execution in the execution environment in the user space, the redirection comprising copying one or more instructions in one or more binary files for the device driver operation from the kernel space to a user process in the user space,
      determine whether an instruction of the one or more instructions copied to the user process requires handling an interrupt handler, and
      assign an interrupt to the instruction to create an exception;
   a user space control module for execution on a processor component to execute the device driver operation in the execution environment in the user space;
   an interrupt handler module for execution on the processor component to receive the interrupt for the instruction; and
   a kernel space control module for execution on the processor component to execute the instruction in the kernel space and revert back to the user space to execute remaining instructions of the one or more instructions of the device driver operation.

2. The apparatus of claim 1, the environment configuration and control module to store information for the execution environment, the information comprising one or more of register information, memory information, and privilege information, and the configuring comprising transferring the information from the kernel space to the user process of the user space for execution of the device driver operation.

3. The apparatus of claim 1, the device driver redirection module to generate an operation to call a kernel control operation with a process identification (ID) of the user process and a redirected operation address for the device driver operation and change one or more of the instructions in the kernel space to initiate the operation.

4. The apparatus of claim 3, comprising:
   a kernel space control module for execution on the processor component including the kernel control operation to receive a call message from the operation with the process ID and the redirected operation address; and
   the user space control module to execute the device driver operation in the user space based on the process ID and the redirected operation address received from the kernel control operation.

5. The apparatus of claim 1, comprising:
   a kernel space control module including a kernel control operation to determine when the device driver operation is in an atomic context, and execute the device driver operation in the kernel space.

6. The apparatus of claim 1, the interrupt handler module to receive a second interrupt when another of the one of the one or more instructions copied to the user process requires handling in the kernel space.

7. The apparatus of claim 6, the interrupt handler module to determine when a kernel operation or device driver operation is called by the device driver operation based on the second interrupt, and send a call message to call the kernel operation or the device driver operation from the kernel space based on the determination.

8. The apparatus of claim 6, the interrupt handler module to determine the device driver operation requires access to kernel memory based on the second interrupt, send an address to access the kernel memory from the kernel space, and receive contents of the kernel memory.

9. The apparatus of claim 1, the interrupt handler module to determine the instruction is a privileged instruction requiring execution in the kernel space based on the interrupt, and send a message to the kernel space control module to execute the privileged instruction in the kernel space.

10. An article comprising a non-transitory computer-readable storage medium comprising instructions that when executed enable a computing device to:
configure an execution environment in a user space for device driver operations to perform debugging and testing;
redirect a device driver operation for execution in the execution environment in the user space including copying instructions in one or more binary files for the device driver operation intended for operation in the kernel space to a user process in the user space;
determine whether an instruction of the one or more instructions copied to the user process requires handling an interrupt handler;
in response to determining the instruction requires handling by an interrupt handler, assign an interrupt to the instruction to create an exception;
execute the device driver operation in the execution environment in the user space; and
receive the interrupt for the instruction;
execute the instruction in the kernel space; and
revert back to the user space to execute remaining instructions of the one or more instruction of the device driver operation.

11. The non-transitory computer-readable storage medium of claim 10, comprising instructions that when executed enable the computing device to:
store information for the execution environment, the information comprising one or more of register information, memory information, and privilege information; and
transfer the information from the kernel space to the user process of the user space for execution of the redirected device driver operation.

12. The non-transitory computer-readable storage medium of claim 10, comprising instructions that when executed enable the computing device to:
generate an operation to call a kernel control operation with a process identification (ID) of the user process and a redirected operation address for the device driver operation; and
change one or more of the instructions in the kernel space to initiate the operation.

13. The non-transitory computer-readable storage medium of claim 12, comprising instructions that when executed enable the computing device to:
receive a call message from the operation with the process ID and the operation address; and
execute the device driver operation in the user space based on the process ID and the redirected operation address received from the kernel control operation.

14. The non-transitory computer-readable storage medium of claim 10, comprising instructions that when executed enable the computing device to:
determine when the device driver operation is in an atomic context; and
execute the device driver operation in the kernel space.

15. The non-transitory computer-readable storage medium of claim 10, comprising instructions that when executed enable the computing device to receive a second interrupt when another one of the instructions requires handling in the kernel space.

16. The non-transitory computer-readable storage medium of claim 15, comprising instructions that when executed enable the computing device to:
determine when a kernel operation or device driver operation is called by the device driver operation based on the second interrupt; and
send a call message to call the kernel operation or the device driver operation from the kernel space based on the determination.

17. The non-transitory computer-readable storage medium of claim 15, comprising instructions that when executed enable the computing device to:
determine the device driver operation requires access to kernel memory based on the second interrupt; and
send an address to access the kernel memory from the kernel space and to receive contents of the kernel memory.

18. The non-transitory computer-readable storage medium of claim 10, comprising instructions that when executed enable the computing device to:
determine the instruction is a privileged instruction requiring execution in the kernel space based on the interrupt; and
send a message to cause the privileged instruction to execute in the kernel space.

19. A computer-implemented method, comprising:
configuring an execution environment in a user space for device driver operations to perform debugging and testing;
redirecting a device driver operation for execution in the execution environment in the user space including copying instructions in one or more binary files for the device driver operation from the kernel space to a user process in the user space;
determining whether an instruction of the one or more instructions copied to the user process requires handling an interrupt handler;
in response to determining the instruction requires handling by an interrupt handler, assigning an interrupt to the instruction to create an exception;
executing the device driver operation in the execution environment in the user space;
receiving the interrupt for the instruction;
executing the instruction in the kernel space; and
reverting back to the user space to execute remaining instructions of the one or more instruction of the device driver operation.

20. The computer-implemented method of claim 19, the configuring comprising:
storing information for the execution environment, the information comprising one or more of register information, memory information, and privilege information; and
transferring the information from the kernel space to the user process of the user space for execution of the device driver operation.

21. The computer-implemented method of claim 19, comprising:
generating an operation to call a kernel control operation with a process identification (ID) of the user process and a redirected operation address for the device driver operation; and
changing one or more of the instructions in the kernel space to initiate the operation to call the kernel control operation.

22. The computer-implemented method of claim 21, comprising:

receiving a call message from the operation with the process ID and the redirected operation address; and executing the device driver operation in the user space based on the process ID and the redirected operation address received from the kernel control operation.

23. The computer-implemented method of claim 19, comprising:

determining when the device driver operation is in an atomic context; and executing the device driver operation in the kernel space.

24. The computer-implemented method of claim 19, comprising:

receiving a second interrupt when another one of the instructions requires handling in the kernel space.

25. The computer-implemented method of claim 19, comprising:

determining when a kernel operation or the device driver operation based on the second interrupt; and sending a call message to call the kernel operation or the device driver operation from the kernel space based on the determination.

\* \* \* \* \*